April 5, 1960        F. C. SCHUSTER        2,931,454
SEAT ACTUATED CLUTCH DISENGAGING MECHANISM
Filed Oct. 20, 1958        3 Sheets-Sheet 1
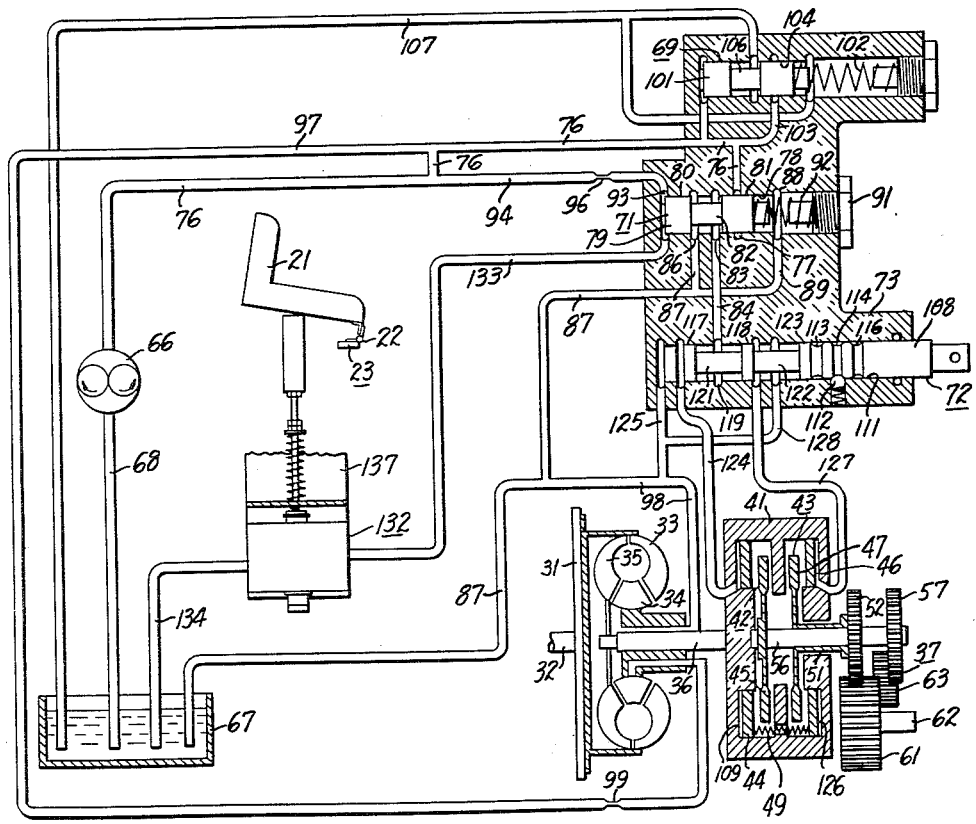
Fig. 2
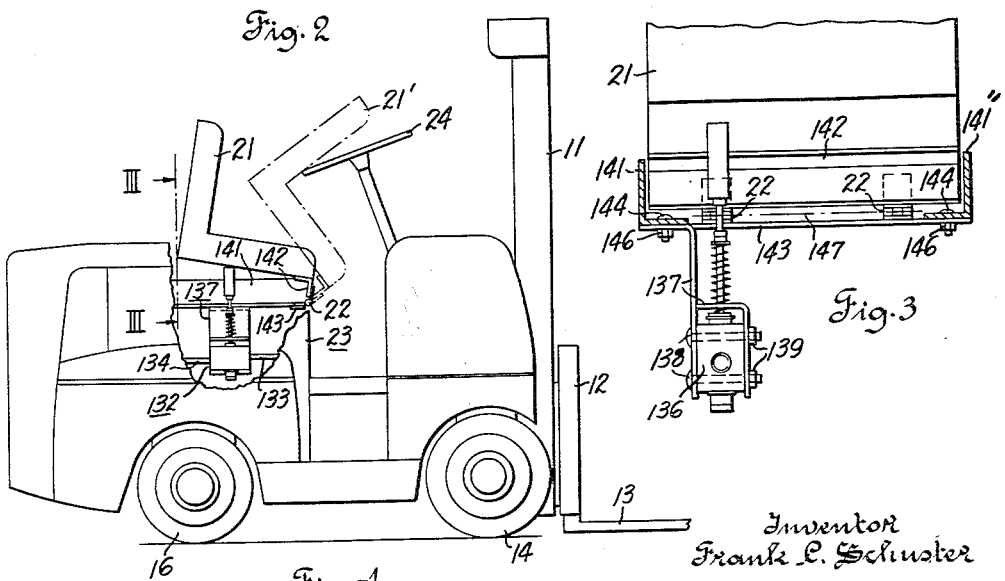
Fig. 1
Fig. 3
Inventor
Frank C. Schuster
By Charles E. Schwab
Attorney

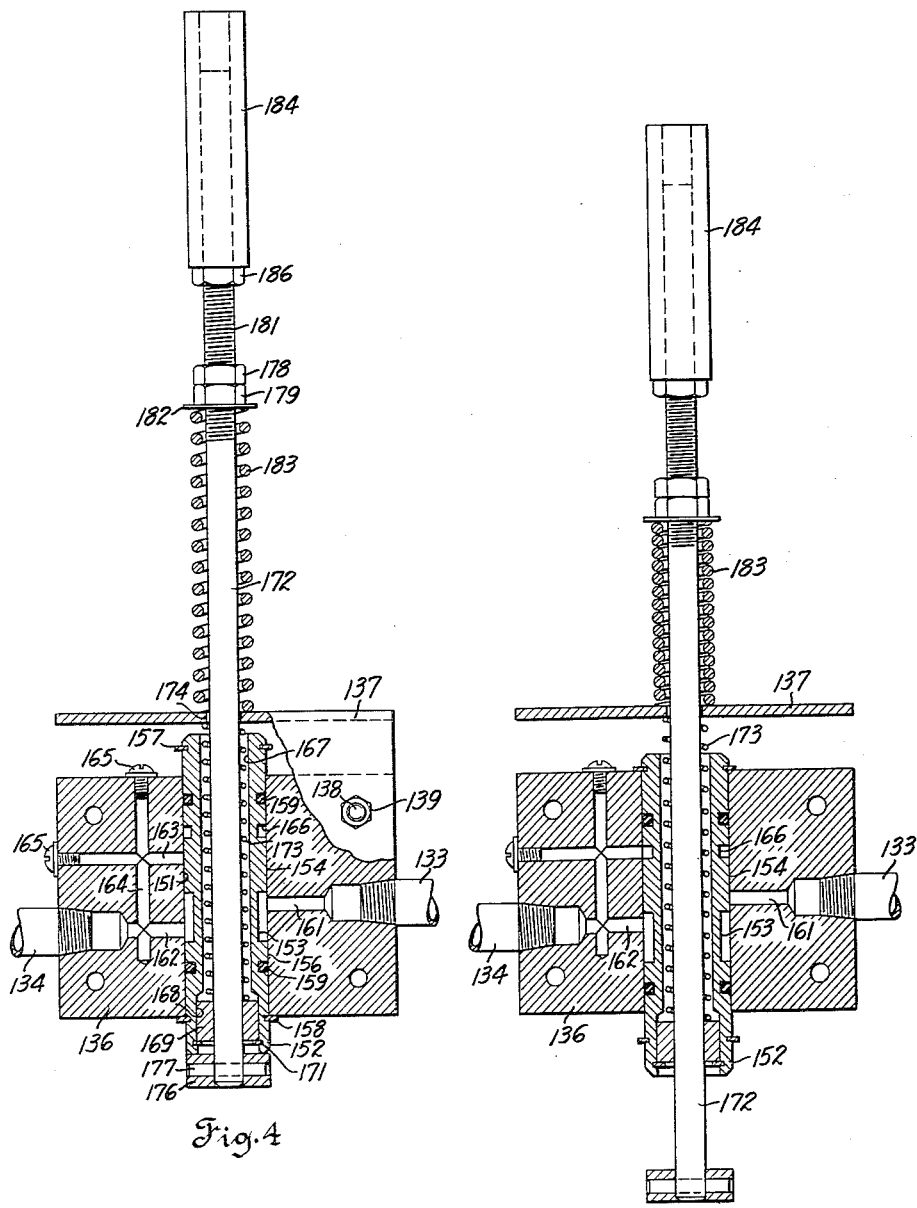

United States Patent Office 2,931,454
Patented Apr. 5, 1960

2,931,454

SEAT ACTUATED CLUTCH DISENGAGING MECHANISM

Frank C. Schuster, Chicago, Ill., assignor to Allis-Chalmers Manufacturing Company, Milwaukee, Wis.

Application October 20, 1958, Serial No. 768,397

7 Claims. (Cl. 180—82)

This invention relates to a safety device for preventing movement of a motor vehicle under its own power when the driver is not in his seat. More particularly this invention relates to a seat actuated control device interposed in the control system of a hydraulic clutch of a vehicle transmission.

Heretofore, deadman controls have been employed in motor vehicles of the type utilizing a brake on the vehicle driving train or wheels whereby when the operator leaves the driver's seat the brakes are applied and the vehicle is abruptly stopped. Also, it has heretofore been suggested that a spring biased seat be employed to disengage the power train between the engine and the driving wheels, two such devices being shown in U.S. patents to T. Brown, No. 2,256,238 and R. O. Acton, No. 2,377,303.

The brake type deadman control has not proven entirely satisfactory, particularly in operation of the vehicle over uneven ground or flooring. When a lift truck or other vehicle is operated over rough terrain the driver is often bounced off the seat thereby causing an application of brakes producing a sudden stop. This sudden stopping has caused the driver to be thrown forwardly into the upright mast structure of a lift truck and into the windshield of other type vehicles.

The mechanical clutch deadman controls heretofore suggested have disengaged the clutch through mechanism acting on the manual clutch control lever or pedal. Such control mechanism is somewhat cumbersome, is difficult to keep in adjustment, and must allow adjustment for clutch wear. Further, this type clutch control is not suitable for use on vehicles using automatic transmissions or hydraulic clutches, since the transmission clutches are engaged by a multiple position lever on the steering column, are push button controlled or are automatically controlled. The clutch type deadman control is particularly desirable on vehicles utilizing a fluid clutch or torque converter transmission since in such vehicles it is possible for the operator to leave the transmission in gear while idling.

The torque converter or fluid clutch type transmission often employs a hydraulic clutch or clutches for each of one or more forward speeds and a hydraulic clutch or clutches for each of one or more reverse speeds. Thus there exists a need for an automatic return to neutral safety device that will disengage whatever transmission clutch is engaged at the time the operator leaves his seat. Such a safety device insures against accidental injury to personnel or destruction of equipment.

It is an object of this invention to provide a seat actuated control to disengage a hydraulic clutch or clutches of a vehicle transmission.

It is also an object of this invention to provide a clutch disengaging device which will fail safe in case of damage.

Another object of this invention is to provide a seat actuated control for disengaging a hydraulically actuated clutch wherein the movement of the operator's seat acts upon a relief valve.

It is a further object of this invention to provide a safety device as hereinbefore described wherein the seat acts on the relief valve through cushioning means.

It is a further object of this invention to provide a seat actuated control for disengaging a power transmitting clutch utilizing a relief valve in a restricted flow of a circuit controlling a dump valve associated with the main clutch control circuit.

It is a further object of this invention to provide a safety device for a multiple hydraulic clutch transmission which will automatically disengage whichever clutch or clutches of such transmission is engaged at the time the operator leaves the seat.

It is a further object of this invention to provide a seat actuated return to neutral device which prevents the supplying of fluid to the transmission control valve of a hydraulic clutch transmission and insures disengagement of the clutches when the operator leaves the seat.

Other objects and advantages of this invention will become apparent upon reading of the following description in conjunction with the drawings in which:

Fig. 1 shows a side view of a fork lift truck with parts broken away to more clearly show a part of this invention;

Fig. 2 shows a schematic view of this invention incorporated in the clutch control system of a torque converter hydraulic clutch type transmission;

Fig. 3 shows a view of the seat actuated control taken along lines III—III of Fig. 1;

Fig. 4 shows a section view of the seat actuated relief valve in a position it would assume when the driver leaves the seat;

Fig. 5 shows a section view of the seat actuated relief valve shown in Fig. 4 when the driver is seated.

Figure 6:
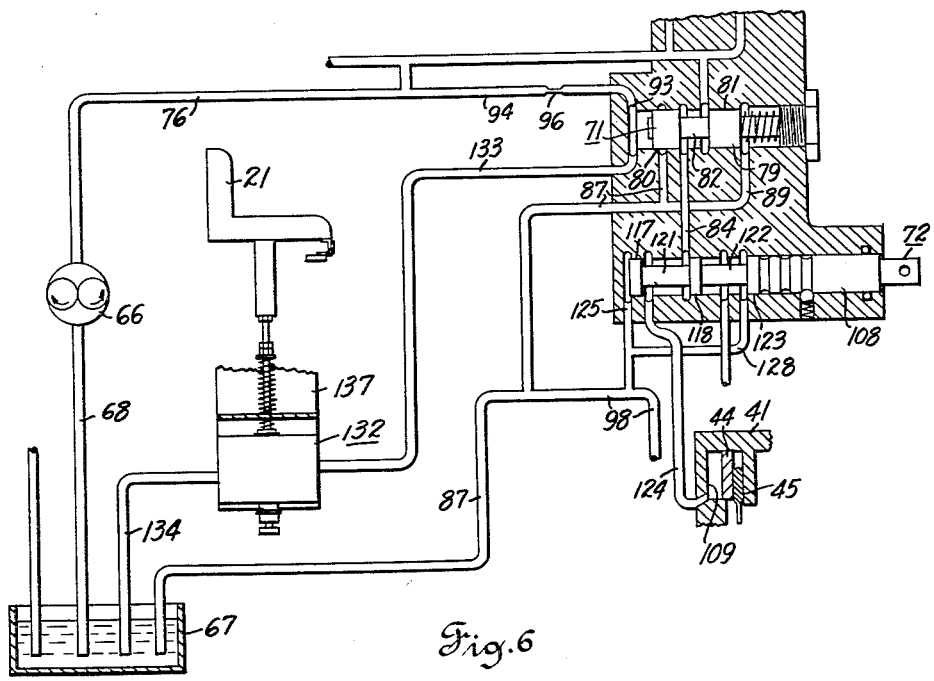
Fig. 6 shows a part of the schematic view of Fig. 2 with the forward clutch engaged.

Referring to Fig. 1 there is shown a fork truck having a mast 11 on which a carriage 12 with forks 13 is carried for up and down reciprocating movement. As is customary in fork truck construction, the front wheels 14 are the driving wheels and the rear wheels 16 are steerable. The operator sits in the seat 21 which is pivotally connected by a pair of hinges 22 to the main frame 23 of the truck. A conventional steering wheel 24 is employed to effect steering of the steerable wheels 16 through linkage, not shown. The seat 21 may be moved vertically about its pivot to position 21' so that the engine and other components beneath the seat may be readily serviced.

Fig. 2 schematically shows a torque converter transmission with hydraulic clutches and a control system therefor. The engine, not shown, drives a flywheel 31 connected to its crankshaft 32. The flywheel is connected in driving relation to an impeller 33 of a conventional torque converter. The torque converter also includes a stator 34 and a turbine 35. The turbine 35 is drivingly connected to a power transmitting shaft 36 which supplies power to a conventional forward-reverse transmission 37. The forward-reverse transmission includes a hydraulic clutch housing 41 encasing a pair of hydraulically actuated clutches 42, 43. Clutch 42, which establishes forward drive, includes a hydraulic piston 44 and a forward drive disk 45. Clutch 43 which establishes reverse drive includes a hydraulic piston 46 and a reverse drive disk 47. A spring 49 holds the pistons in disengaging positions when they are not under the influence of pressure fluid. The reverse drive disk 47 is connected in driving relation to a reverse disk quill shaft 51 on which a reverse gear 52 is mounted for rotation therewith. The forward drive disk 45 is connected in driving relation to a forward disk shaft 56 to which forward gear 57 is nonrotatably secured. A drive gear 61 meshes with reverse gear 52 and is connected in driving relation to an output shaft 62. An idler gear 63 meshes with both the drive gear 61 and forward gear 57.

Thus, a forward-reverse torque converter transmission with two clutches has been described and it is this type of transmission which is installed in the fork truck of Fig. 1 and to which this invention, hereinafter to be described, is associated.

The hydraulic control system for the clutches 42, 43 includes a pump 66 drawing fluid from a reservoir 67 through a passage 68, a regulator valve 69, a dump valve 71 and a control valve 72. Valves 69, 71 and 72 are housed in valve body 73. A passage 76 connects the pump 66 in fluid communication with a groove 77 in bore 78 of valve body 73 in which the dump valve 71 reciprocates. The valve 71 in addition to the bore 78 and annular port 77 includes a valve spool 79 having lands 80, 81 and recessed portion 82, annular port 83 communicating with passage 84 leading to the control valve 72 and annular port 86 communicating with passage 87 to the reservoir 67. Port 88 and passage 89 are provided to permit high pressure leakage to drain to the reservoir. A cap 91 is screwed into a threaded portion of an enlarged portion of bore 78. A spring 92 urges spool 79 to the left to a fluid dumping position in which supply passage 76 is blocked and passage 84 is in communication with return passage 87. A pressure chamber 93 is provided at the end of bore 78 and is subjected to fluid from pump 66 through a restricted passage 94, in which a flow restrictor 96 is positioned.

A converter supply passage 97 and converter return passage 98 circulate a portion of the fluid supplied by pump 66 through the torque converter in a conventional manner, a restrictor 99 being provided to limit flow to a predetermined amount.

The regulator valve 69 includes a valve spool 101 biased to a closed position by spring 102. When the pressure in supply passage 76 exceeds a predetermined amount the spool moves to the right, in opposition to the spring 102, due to force of fluid on the left end of the spool, permitting supply fluid to flow from passage 76 through passage 103 through bore 104 about recessed portion 106 of spool 101 thence to the reservoir 67 through return passage 107.

The control valve 72 includes a valve spool 108 slidably mounted in bore 111. Spool 108 is releasably held in one of three detented positions by a spring biased ball 112 which is selectively registrable with grooves 113, 114 and 116 in the spool 108. The control valve spool 108 is shown in Fig. 2 in a neutral, clutches disengaged position in which fluid from passage 84 is prevented from flowing to either clutch by lands 117, 118. A supply port 119 connects passage 84 with bore 111. Recessed portions 121 and 122 are, respectively, provided in the valve spool 108 between land 117 and land 118 and between land 118 and land 123.

In the neutral position of the spool 108 the fluid may flow from the pressure chamber 109 between the forward clutch piston 44 and the clutch housing 41 to the reservoir 67 through passage 124, an open portion of bore 111, passage 125 and passages 98, 87, and fluid may flow from the pressure chamber 126 between reverse piston 46 and the clutch housing 41 through passage 127, bore 111, passage 128 thence to the reservoir through passages 125, 98, 87.

The control valve 72 has a forward clutch activating position and a reverse clutch activating position. When the control valve is adjusted to a forward clutch activating position (detent ball 112 in groove 116) pressure fluid from passage 84 flows to pressure chamber 109 and reverse gear pressure chamber 126 remains open to the reservoir. When the control valve is adjusted to a reverse clutch activating position detent ball 112 is in groove 113 and lands 117 and 118 and recessed portion 121 direct pressure fluid from control valve supply passage 84 to reverse gear pressure chamber 126.

The dump valve spring 92 is lower rated than regulator spring 102 and therefore in operation dump valve 71 is in a fluid supplying position when the pump pressure reaches a first predetermined amount which is less than a second predetermined pressure required to move regulator valve 69 to a return to reservoir position. Thus, when the pressure in dump valve chamber 93 reaches said first predetermined amount the dump valve adjusts to a fluid supply position in which passage 84 is in fluid communication with supply passage 76.

The transmission and hydraulic system thus far described in detail contribute the environment in which a seat actuated clutch disengaging mechanism is employed.

In order to disengage whichever hydraulic clutch might be employed a seat actuated relief circuit is interposed between pressure chamber 93 and the reservoir. This relief circuit includes a relief valve 132 which is connected to chamber 93 by a passage 133 and which is connected to the reservoir 67 by a passage 134.

As shown in Figs. 1 through 5 the valve housing 136 of relief valve 132 is secured to a bracket 137 by four bolts 138 and nuts 139. Bracket 137 is secured by any suitable means to channel member 141.

The hinges 22 are of the strap type, each having one of their straps secured by any suitable means to the front face of a cross channel 142 to which the seat 21 is secured, and each having the other of their straps secured by suitable means to a cross beam 143 which is connected at its opposite ends to channels 141, 141' by bolts 144 and nuts 146. The hinges 22 mount the seat 21 for vertical swinging movement about a transverse axis 147.

As shown in Figs. 4 and 5 the relief valve housing 136 has a bore 151 in which a relief valve spool 152 is slidably mounted for movement between the fluid flow position shown in Fig. 4 and the fluid blocked position shown in Fig. 5. A recessed portion 153 is provided in spool 152 between lands 154, 156. Snap rings 157, 158 limit upward and downward movement of spool 152 relative to the housing 136. O-rings 159 seal the spool and bore wall. A passage 161 completes passage 133 to bore 151 and a passage 162 completes passage 134 to bore 151. Cross drilled holes 163, 164 in housing 136 together with recess 166 in spool 152 permit escape of high pressure leakage to the reservoir 67 when the relief valve is in a fluid blocking position as shown in Fig. 5. Screws 165 plug holes 163, 164 at their outer ends.

The relief valve spool 152 has a central bore 167 with an enlarged portion 168 at its lower end. A bushing 169 is disposed within the enlarged portion 168 of bore 167 and is maintained in place by an internal retaining ring 171. Spring means in the form of a coil spring 173 is disposed within bore 167 between bracket 137 and bushing 169 and urges valve spool 152 toward a fluid blocking position. A seat actuated control member in the form of a rod 172 passes through an opening 174, extends through spring 173 in bore 167 and through bushing 169. The rod 172 carries a collar 176 at its lower end which is secured to the rod by a pin 177 extending through holes in the collar and rod. Jamb nuts 178, 179 are threaded onto a threaded portion 181 of the rod 172 and a washer 182 is disposed immediately below them. A resilient member in the form of a coil spring 183 of higher rate than spring 173 is mounted concentrically on the rod 172 between the washer 182 and bracket 137. An internally threaded rod length adjusting tube 184 is threaded onto threaded portion 181 of rod 172 and releasably locked in place by a jamb nut 186.

When the operator sits on the seat 21, the underside of the seat abuts the top of tube 184 of rod 172 and his weight is sufficient to compress spring 183, thereby adjusting the relief valve to its fluid blocking position as shown in Figs. 5 and 6. As shown in Figs. 5 and 6, the rod may move a greater distance than necessary to adjust the valve spool and this is permitted since a spring loaded relief valve is used and since the rod 172 is free to slide in the bushing 169. With passage 133 blocked by spool 152 the pressure will be increased in pressure chamber 93 by pump 65 sufficiently to adjust dump valve 71 to its fluid supplying position. Thus when the operator is seated, pressure fluid is available to the control valve to supply whichever hydraulic clutch the operator wishes to select through adjustment of the control valve. In Fig. 6 the control valve has been moved to a forward clutch actuated position and the vehicle is being propelled forwardly. The forward piston 44 frictionally engages disk 45 between it and the clutch housing 41 to establish a power transmitting relation.

When the operator leaves the seat 21 while either the forward or reverse clutch is engaged, the following takes place automatically. The spring 183, which constitutes a resilient means or member, moves the seat 21 to a raised unoccupied position such as it is shown in Figs. 1 and 2. The spring 183 also forces rod 172 upwardly and in so moving the collar 176 abuts the valve spool 152 and moves it to its fluid flow position shown in Fig. 4. Fluid flows from chamber 93 faster than it can be supplied through restrictor 96 thereby causing the pressure to drop below that required to overpower spring 92. Spring 92 then moves the dump valve spool 79 to a fluid blocking position in which position fluid communication is established between the reservoir and control valve supply passage 84. With the control valve adjusted to a forward drive position as shown in Fig. 6 fluid would flow from the pressure chamber 109 to the reservoir since it would be in fluid communication therewith and spring 49 would urge piston 44 out of engagement with disk 45. Thus when the operator leaves the seat the pressure fluid supply passage to the control valve is automatically blocked from the pressure fluid supply and connected to the return or reservoir passage 87. Neither of the hydraulic clutches can be engaged when the operator is off the seat regardless of whether the control valve is in a forward, neutral or reverse drive position of adjustment.

Placing the relief circuit in communication with the dump valve actuating passage 94 intermediate the restrictor 96 and dump valve 71 is operationally superior to placing the relief circuit in communication with other passages such as passages 76, 84, 124, or 127 because there may be sufficient back pressure in the latter arrangements to maintain the clutch in engagement. By providing a safety device which effects a blocking of supply of fluid to the control valve and a connecting of the clutch supply passage 87 to the reservoir or return passage 87, the safety device is effective regardless of the number of hydraulic transmission clutches that might be controlled by control valve 72. In other words, control valve 72 may be used in a multiple forward speed transmission of the quick shift type or automatic shift type and this invention would be equally applicable.

It should be noted that this automatic clutch disengaging mechanism will fail safe, that is, if passage 133 or 134 ruptures, the hydraulic clutches will be disengaged.

It should be understood that it is not intended to limit the invention to the embodiment hereinabove described and shown and that the invention includes such other forms and modifications as are embraced by the scope of the appended claims.

What is claimed is:

1. In a self-propelled vehicle having a main frame and a hydraulically actuated clutch in the power train between its power plant and driving wheels, the combination comprising: an operator's seat vertically movable between a raised unoccupied position and a lowered occupied position; a resilient member biasing said seat toward said raised unoccupied position; a hydraulic control system for said clutch including a reservoir, a pump, a control valve having clutch activating and clutch disengaging positions, a first fluid passage connecting said pump and control valve, a second fluid passage connecting said control valve and clutch, a pressure actuated dump valve interposed in said first passage having fluid supplying and fluid dumping positions, said clutch being disengaged when said control valve is in said clutch engaged position and said dump valve is in said dumping position, a pressure chamber at one end of said dump valve, a third fluid passage between said pump and pressure chamber, means resiliently maintaining said dump valve in said fluid supplying position when the fluid pressure in said pressure chamber is below a predetermined amount, and a restrictor in said third passage limiting the flow of fluid, said dump valve being positioned in said fluid supplying position when the fluid pressure in said chamber exceeds said predetermined amount; a fourth passage connecting said pressure chamber in fluid communication with said reservoir, a relief valve interposed in said fourth passage having a fluid blocking position and a fluid flow position; and a valve control member between said seat and said relief valve, said control member moving said relief valve to said fluid flow position through the biasing action of said resilient member when the operator ceases to occupy said seat thereby reducing fluid pressure in said pressure chamber below said predetermined amount.

2. The combination set forth in claim 1 wherein said relief valve includes a valve body secured to said main frame and presenting a bore, a valve spool reciprocably mounted in said bore for movement between fluid blocking and fluid flow positions and spring means between said main frame and said spool biasing the latter toward its fluid blocking position, and wherein said control member includes a rod engaging said spool to move the latter toward its fluid flow position, and further comprising a resilient means urging said rod and seat upwardly with sufficient force to overcome the biasing effect of said spring means.

3. The combination set forth in claim 2 wherein said valve spool presents a longitudinal bore through its length and said rod extends through said longitudinal bore and presents an abutment in thrust transmitting relation to one end of said valve spool.

4. The combination set forth in claim 3 wherein said resilient means comprises a coil spring and said spring means comprises a coil spring surrounding said rod and disposed within said longitudinal bore.

5. The structure set forth in claim 4, wherein said rod is disposed in abutting relation to the underside of said seat permitting separation of said seat and rod upon vertical swinging movement of said seat.

6. In a self-propelled vehicle having a main body, a hydraulically actuated clutch for effecting and disrupting power to its driving wheels, a source of pressure fluid for actuating said clutch, a hydraulic control system for operating said hydraulic clutch including a reservoir, a control valve for directing fluid to and from said clutch, a pressure actuated dump valve, a first fluid passage between said source of pressure fluid and said dump valve, a second fluid passage between said dump valve and said control valve, a third fluid passage between said control valve and said clutch, a fourth fluid passage between said source and said dump valve, and a restrictor in said fourth passage the combination comprising: a relief valve adjustable to open and closed position, a fifth fluid passage interconnecting said relief valve and said fourth passage, a sixth fluid passage between said relief valve and said reservoir, an operator's seat mounted on said main body for vertical movement between an operator seated position and a raised position, a motion transmitting member between said seat and relief valve and resilient means biasing said seat toward said raised position and said relief valve toward said open position.

7. In a self-propelled vehicle having a main frame and a plurality of hydraulically actuated clutches in the power train between its power plant and driving wheels, the combination comprising: an operator's seat vertically movable between a raised unoccupied position and a lowered occupied position; a resilient member biasing said seat toward said raised unoccupied position; a hydraulic control system for said clutches including a reservoir, a pump, a first valve for selectively directing fluid to and from said clutches to respectively engage and disengage the latter, a first fluid passage connecting said pump and a first valve, and second and third fluid passages establishing fluid communication between said first valve and clutches, respectively; and fluid control means for establishing fluid communication between said first passage and said reservoir when said seat is in said raised unoccupied position including a second valve interposed in said first passage movable to fluid supplying and fluid dumping positions, a fourth passage between said second valve and said reservoir, and means associated with said seat and second valve for moving the latter to said fluid dumping position when said seat is in said raised unoccupied position, said first passage being in fluid communication with said fourth passage when said second valve is in said dumping position.

References Cited in the file of this patent

UNITED STATES PATENTS

| | | |
|---|---|---|
| 1,277,188 | Bulley | Aug. 27, 1918 |
| 2,144,074 | Maybach | Jan. 17, 1939 |
| 2,377,303 | Acton | June 5, 1945 |

FOREIGN PATENTS

| | | |
|---|---|---|
| 517,120 | Italy | Feb. 26, 1955 |